United States Patent
Moreira

(10) Patent No.: US 7,961,965 B2
(45) Date of Patent: *Jun. 14, 2011

(54) TRANSMITTING MULTIMEDIA WITH R-TREE-BASED MULTIDIMENSIONAL HIERARCHICAL CATEGORIZATION TREES TO COMPRESS IMAGES

(75) Inventor: Eduardo Moreira, Porto Alegre, RS (BR)

(73) Assignee: Indinell Sociedad Anonima, Montevideo (UY)

( * ) Notice: Subject to any disclaimer, the term of this patent is extended or adjusted under 35 U.S.C. 154(b) by 73 days.

This patent is subject to a terminal disclaimer.

(21) Appl. No.: 12/275,009

(22) Filed: Nov. 20, 2008

(65) Prior Publication Data

US 2009/0285311 A1    Nov. 19, 2009

Related U.S. Application Data

(63) Continuation of application No. 10/855,570, filed on May 28, 2004, now Pat. No. 7,471,839, which is a continuation of application No. 09/628,436, filed on Jul. 28, 2000, now abandoned.

(60) Provisional application No. 60/146,151, filed on Jul. 30, 1999.

(51) Int. Cl.
  *G06K 9/36* (2006.01)
  *H04N 7/26* (2006.01)
(52) U.S. Cl. .................... 382/240; 375/240.26
(58) Field of Classification Search ............... 382/240; 375/240.26
See application file for complete search history.

(56) References Cited

U.S. PATENT DOCUMENTS

| | | | |
|---|---|---|---|
| 5,384,867 A | | 1/1995 | Barnsley et al. |
| 5,710,916 A | * | 1/1998 | Barbara et al. ............ 1/1 |
| 5,748,240 A | | 5/1998 | Carr et al. |
| 5,870,502 A | | 2/1999 | Bonneau et al. |
| 6,094,631 A | | 7/2000 | Li et al. |
| 6,111,988 A | | 8/2000 | Horowitz et al. |
| 6,134,541 A | * | 10/2000 | Castelli et al. ............ 1/1 |
| 6,148,295 A | * | 11/2000 | Megiddo et al. ............ 1/1 |
| 6,157,674 A | | 12/2000 | Oda et al. |
| 6,163,628 A | | 12/2000 | Ibenthal et al. |
| 6,370,502 B1 | | 4/2002 | Wu et al. |

FOREIGN PATENT DOCUMENTS

EP    0742672    11/1996

OTHER PUBLICATIONS

"Optimal Hierachical Partitions for Fractal Image Compression," Saupe et al., Proceedings of IPCIP '98 International Conference on Image Processing, Chicago, IL, USA, Oct. 4-7, 1998, pp. 737-741.

* cited by examiner

*Primary Examiner* — Wenpeng Chen
(74) *Attorney, Agent, or Firm* — Arent Fox LLP

(57) ABSTRACT

An apparatus for transmitting multimedia, the apparatus including an image compression unit for compressing an image portion of a multimedia data frame, an audio compression unit for compressing an audio portion of the multimedia frame, a bit rate manager in communication with said image compression unit, and said audio compression unit for controlling frame flow, and a merger unit in communication with each of said image compression unit and said audio compression unit for merging a compressed image portion and a compressed audio portion into a single compressed multimedia frame, wherein the image compression unit utilizes multidimensional hierarchical categorization trees to compress said image portion, and wherein the multidimensional hierarchical categorization trees examine pixel blocks that are structurally similar to a reference block, and organize pixel blocks in a hierarchical manner.

50 Claims, 5 Drawing Sheets

TRANSMITTING MULTIMEDIA WITH R-TREE-BASED MULTIDIMENSIONAL HIERARCHICAL CATEGORIZATION TREES TO COMPRESS IMAGES

CROSS-REFERENCE TO RELATED APPLICATION

This application is a continuation of U.S. patent application Ser. No. 10/855,570, filed May 28, 2004, which claims priority to U.S. Provisional Patent Application No. 60/146,151, filed Jul. 30, 1999, the entire specification claims and drawings of which are incorporated herein by reference.

BACKGROUND OF THE INVENTION

1. Field of the Invention

The present invention relates to a method and apparatus for transmitting, processing, and/or storing digital images using minimal bandwidth, processor overhead, and/or storage capacity. In particular, the present invention relates to a new data compression apparatus and method that can be utilized to effectively compress multimedia images and the accompanying audio for efficient transmission across a limited bandwidth transmission line, thereby providing real-time multimedia compression, transmission, decompression, and viewing at a second location.

2. Description of the Related Art

The present invention substantially advances known techniques for transmitting, storing, and processing digital multimedia images through the use of novel compression and decompression techniques. The compression and decompression techniques of the present invention are applicable for use in nearly all image related data transmission, processing, and storage technologies, as the techniques of the present invention provide for efficient and accurate digital image transmission, storage, and processing through currently available transmission, storage, and processing means.

SUMMARY OF THE INVENTION

The present invention is directed to an apparatus for transmitting multimedia, wherein the apparatus includes an image compression unit for compressing an image portion of a multimedia data frame, an audio compression unit for compressing an audio portion of the multimedia frame, and a bit rate manager in communication with the image compression unit and the audio compression unit for controlling frame flow. A merger unit in communication with each of the image compression unit and the audio compression unit is provided for merging a compressed image portion and a compressed audio portion into a single compressed multimedia frame, wherein the image compression unit utilizes multidimensional hierarchical categorization trees to compress the image portion.

The present invention is also directed to an apparatus for compressing multimedia data including an image compression module, an audio compression module, and a control interface in connection with the image compression module and the audio compression module, wherein the image compression module uses hierarchical categorization trees to compress an image portion of a multimedia data, and the audio compression module uses a filter bank decomposition operation to compress a corresponding audio portion of the multimedia data.

The present invention is also directed to a method for compressing multimedia data including the steps of receiving multimedia, separating an audio portion of the multimedia and an image portion of the multimedia, compressing the image portion with hierarchical categorization trees, compressing the audio portion with a filter bank decomposition, and merging and synchronizing the compressed audio and image portions for transmission.

The present invention is also directed to an apparatus for transmitting multimedia, wherein the apparatus includes an image compression means for compressing an image portion of a multimedia data frame, an audio compression means for compressing an audio portion of the multimedia frame, and a bit rate manager means in communication with the image compression means, and the audio compression means for controlling frame flow. Further, a merger means in communication with each of the image compression means and the audio compression means if provided for merging a compressed image portion and a compressed audio portion into a common compressed multimedia frame, wherein the image compression means utilizes multidimensional hierarchical categorization trees to compress the image portion.

The present invention is further directed to an apparatus for compressing multimedia data, wherein the apparatus includes an image compression means, an audio compression means, and a control means in connection with the image compression means and the audio compression means, wherein the image compression means uses hierarchical categorization trees to compress an image portion of a multimedia data, and the audio compression means uses a filter bank decomposition operation to compress a corresponding audio portion of the multimedia data.

The present invention is additionally directed to an apparatus for compressing images, wherein the apparatus includes an image compression unit for compressing an image, wherein the image compression unit utilizes multidimensional hierarchical categorization trees to compress the image portion.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
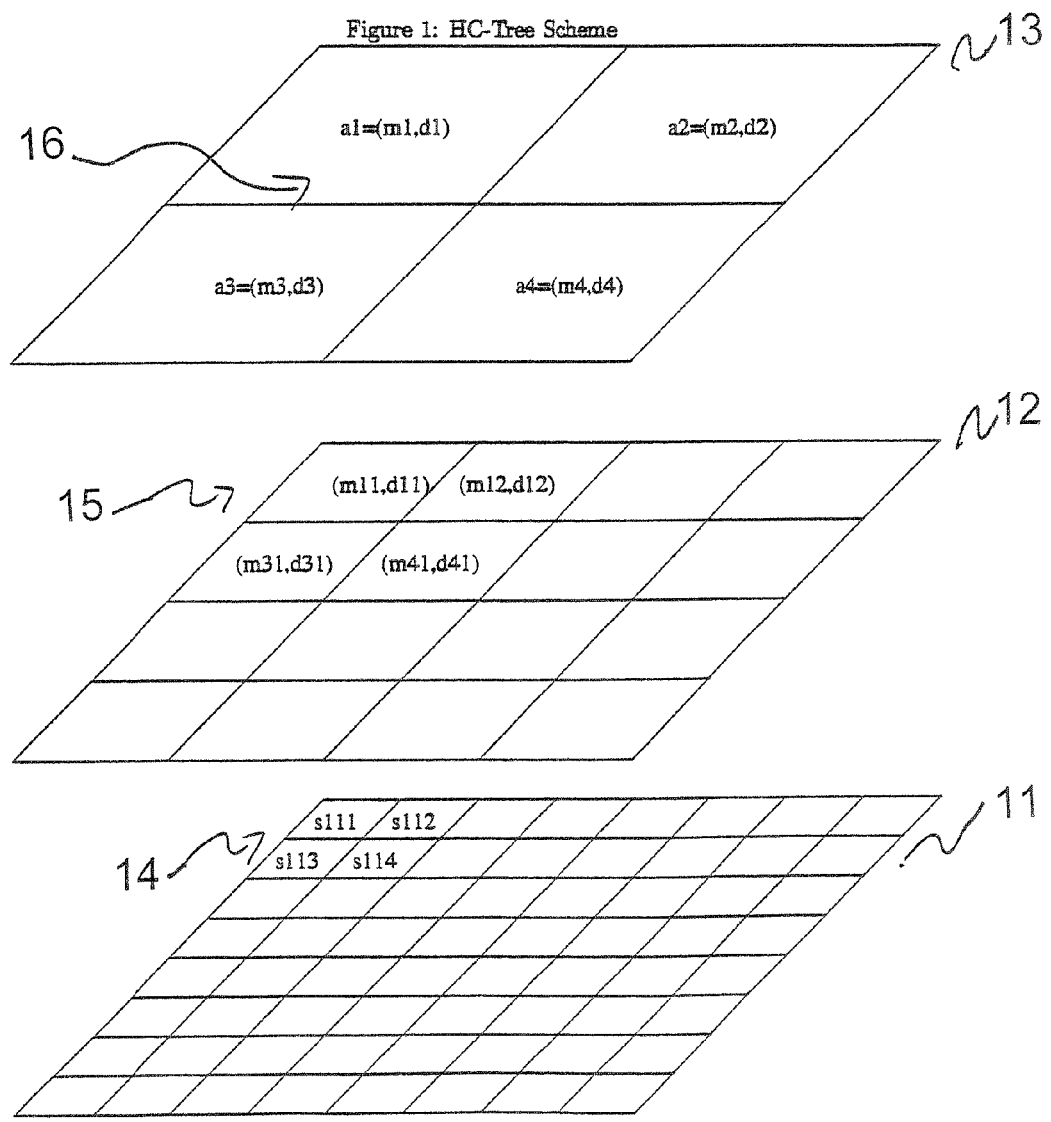
FIG. 1 is a first general illustration of HC tree construction.

Digital imaging processing, compression and transmission is an important area of advancement in the computer field, as an ever increasing number of computer hardware and software applications utilize digital images. The field of digital image processing is known to include storage, compression, transmission, and receipt of images that are represented by a plurality of bits or bytes, wherein each bit or byte corresponds to a characteristic of a particular point within the image. Each individual point within the image, which is often referred to as a pixel, has a number of binary values associated therewith, which cooperatively indicate and/or determine whether the pixel should be illuminated or not, and furthermore, the intensity and/or color of illumination of the pixel. Therefore, for example, in a general 520×480 pixel color image on a computer display, approximately 2 megabytes of data would be required to represent this image, assuming each pixel had 8 color bits associated therewith (520×480×8=1,996,800). In situations with larger images having more colors, which is standard within current computer applications, larger blocks of data are required to represent the increased number of pixels and colors associated with the image.

In view of the substantial size of digital images in the current computing environment, along with the associates storage, processing, and/or transmission of such images, some form of compression of the image is clearly necessary in order to effectively manage the storage, processing, or transmission operations. In particular, in order to effectively transmit image and sound data combined, which is generally termed video and/or multimedia, across a commonly available bandwidth, the multimedia/video data absolutely must be compressed in order to maintain reasonable image and sound quality at the receiving end. Further, as a result of the inherent size of video and/or multimedia images and their associated audio, in conjunction with the generally available bandwidth in communications media, numerous concerns surround the aforementioned compression operations. For example, image quality, bandwidth adaptation, playback performance, memory consumption, coding symmetry, size and frame rate scalability, interaction delay, and platform portability are common considerations that must be addressed by a compression operation.

Upon review of these considerations, one of the most promising approaches to image compression currently available is the fractal compression approach, which is also known as iterated function systems (IFS). The basis for fractal compression or encoding takes advantage of the fact that many sub-parts of an image are repeated within the image itself, and therefore, a representative image can be created by a mapping of the portions of the image to fractions of representative sub-parts of the original image. These sub-parts are generally termed blocks. Fractal encoding subdivides an image to be encoded into blocks, which taken as a whole, make up a close approximation of the entire original image. Although some of the blocks may overlap and be of different sizes, an approximation of the entire original image is represented by the compilation of generated blocks. In conventional fractal encoding, the original image is divided into two sets of blocks, the first set of blocks is the domain blocks, while the second set of blocks is termed the range blocks. The domain blocks are capable of being rotated, and have mirror images created in order to create more choices of domain blocks, which can be compared against the range blocks. Each domain block is compared to each range block to determine the closest match, and the mapping of the domain blocks to the range blocks is stored. Only information regarding matching blocks is used, and the remaining blocks may be discarded, thus inherently compressing the data representative of the original image, as trivial blocks have been eliminated. Therefore, generally speaking, early versions of fractal encoding illustrated how typically self-similar fractal sets and measures could be generated by parallel action of systems of contraction mappings. The IFS maps plus a set of associated probabilities (IFSP) defined operators, which acted on probability measures. However, since it is more convenient and efficient to represent images and signals by functions, the focus of IFS-type methods shifted to the approximation of images and signals by functions that are generated by the iteration of an IFS-type operator. Therefore, currently, the basic idea supporting fractal image compression is to represent an image originally given as a square of pixels by a family of transformation operators with a much more economical representation. Through the use of information regarding course-grained structures, suitable operators allow the generation of fine grained details within the images. The iterated application of these operators to an arbitrary image will therefore continuously approximate the original image.

Although current fractal image compression techniques yield relatively high compression ratios and are well approximating for purposes of human perception, current techniques are inherently lossy with regard to image quality. In particular, current mapping techniques are known to produce images with blurred edges and distorted detail, as the level of compression necessary to obtain an efficiently transmittable image requires discarding of blocks that actually contribute to the image perception. Furthermore, current fractal image compression techniques are highly asymmetrical in nature, and therefore, the compression operation is extremely slow. More particularly, current fractal image compression techniques inherently suffer from the excessive time needed to search through potential pairings of image blocks in order to capture the self similarity of the image. This additional time required to search for image block pairings renders fractal compression techniques undesirable for many current applications, as the ability to process and transmit real-time multimedia data is considered a necessity in the current market.

Another technique for compressing digital image information is wavelet edge detection or Wavelet Packet transform (WP). Wavelet compression based techniques utilize the fact that images have spatial and spectral redundancies therein, which can be eliminated from the image to be stored or transmitted in order to reduce the size of the data structure. Put simply, wavelets transform an image into a set of basic functions, in similar fashion to the application of a Fourier transform, which uses mathematical operations such as sines and cosines as a basis set. When the set of basis functions is applied, the original image is transformed into a set of coefficients. These coefficients can then be further transformed with a derivative or gradient operation being applied to the basis set. The coefficients then take the form of edges in different frequency bands or scales, which allows for an efficient means of image and video compression. However, in similar fashion to fractal encoding, wavelet compression techniques also suffer from the drawback of long coding delays and degraded image quality. Therefore, in view of the apparent disadvantages associated with current fractal encoding and WP related compression techniques, there clearly exists a need for a compression technique capable of quickly, efficiently, and accurately compressing a digital multimedia image and its accompanying audio, thereby allowing the compressed image and audio to be efficiently stored, processed, and/or transmitted across generally available communications media.

In response to the above noted deficiencies of previous compression methods and algorithms, the present invention provides a real-time video/multimedia compressor capable of compressing color multimedia (which will be used herein to reflect a string of video images having an accompanying synchronized audio signal associated therewith) suitable for transmission through communications media having bandwidths of, for example, 20 Kbps to 1.2 Mbps, without a noticeable loss of detail from the image. This is accomplished by addressing a known problem with regard to IFS compression techniques, which is the determination of the best range of block pairings. Therefore, as a result of the present invention, exceptional motion tracking of detail within images is provided at generally low bit rates. Furthermore, although hardware driven embodiments are contemplated within the scope of the present invention, the present invention, for example, is capable of being executed solely through a software driven implementation.

The image compressor of the present invention is centered around a new and improved image compression algorithm that is based upon IFS, wherein a new technique of using hierarchical categorizations (HC) of pixel blocks is incorporated into an IFS based compression algorithm. This new compression algorithm is utilized not only for the coding of single frames (Intraframes), but also, and more applicably, for coding of sequences of frames (Interframes), wherein the coding is order preserving and based upon conditional block plenishment of sequential frames. Integrated use of data structures and algorithms is one of the main reasons for the resulting high quality of images compressed and transmitted using the present invention. Furthermore, the ability to efficiently compress sequences of images is complemented by an extremely efficient audio codec that is based upon wavelet packet transforms with adaptive quantization. This configuration, for example, allows for effective color image sequence compression up to 1024×1024, with the accompanying audio at reasonable quality, and further, real time image frame processing of approximately 30 frames per second over low bandwidth requirements of approximately 20 Kbps to 1.2 Mbps. This compressed or coded data can be implemented in software and decoded or decompressed with a small binary decoder, which is generally less than 200 KB, through fractal interpolation. Further, since the present compression technique is based upon known fractal encoding frameworks, the present compression technique is easily compatible with most known compression frameworks.

The foundation of the present approach to multimedia compression is based upon the principle that categorizations of pixel blocks are organized in hierarchical manner using multidimensional trees, thus avoiding existing multidimensional tree strategies that use a full pixel-to-pixel comparison of a pair of blocks, which operates to substantially reduce the overall number of range-domain block comparisons necessary to compress multimedia files. The present HC approach to multimedia compression combines the constructive method of searching provided through multidimensional trees with the efficiency of an abstract and quantitative categorization. More particularly, a multidimensional tree in which pixel blocks are hierarchically categorized is generated, and then optimized to eliminate unnecessary redundancies. Therefore, the search phase of the compression operation is essentially reduced to a mere consulting of the multidimensional tree. Further, generation an abstract and qualitative classification of an image block refines the idea of computing an abstract representation of an image, and therefore, the present invention also utilizes the basic underlying principle of wavelet partitioning. This underlying principle, generally speaking, is to partition an image into one part representing the average, and a second part representing a difference of all constituting values. Therefore, the HC tree compression is configured to examine blocks that are structurally similar to a reference block, as opposed to previous techniques, that focused upon examining only those domain blocks that were proximate to a particular range block. This structural search based compression technique allows for image quality to remain high, while reducing the search time required.

The conditional block plenishment operation used for coding sequential frames noted above is based upon approximating a new image through reference to an old image. Through consulting the precomputed data structure for the original image, the search speed for the updated image can be improved, as noted above. However, an additional gain in search efficiency is realized in using conditional block plenishment as a result of the fact that the original data structure can be reused for multiple images, thus eliminating the need to continually regenerate and or precompute an original data structure for comparison. Further, using this approach, the construction of the HC tree can then be incrementally obtained for a new image.

The corresponding audio codec of the present invention is configured to compress and transmit the audio associated with the multimedia video image in real-time synchronization, and at quality that is essentially imperceptible through non electronic means from the original audio. This is accomplished in the present invention through the use of a WP transform as the filter bank decompression tool, which results in a non-uniform decomposition that closely matches the critical frequency bands of a psychoacoustic model. More particularly, a series of Daubechies wavelet filters are used to compromise between the low delays associated with shorter filters and the inherent increase in audio quality associated with longer filters. The quantization factors are determined adaptively for each audio frame from iterating the analysis of the quantization noise and masking threshold obtained from a perceptual masking model. In order to decode the compressed audio signal, a simple dequantization step is followed by the inverse WP transform to obtain the reconstructed audio signal.

In order to fully comprehend the compression technique of the present invention, it is beneficial to discuss the foundational principles of the basic unmodified fractal image compression approach. Without loss of generality, let (X; d) denote a compact metric space, which will be termed the "pixel space." A function c: X→X is a contraction if there is a constant k∈[0, 1], such that $d(c(x), c(y)) \leq kd(x,y)$ for all x, y∈X. Further, let the space of functions be F(X)=L·L(X), such that, for example, the set of functions f:X→R, satisfies equation (1) shown below.

$$\|f\|_2^2 = \int_x |f(x)|^2 dx < \infty \tag{1}$$

Iterated function systems with Grey Level Maps (IFSM) are an example of IFS or fractal transform method over functions in F (X) representing images. Furthermore, an N-level map IFSM where M (ω, Φ) is a tuple where:
1. $\omega = \{\omega_1, \omega_2, \ldots, \omega_N\}$, called the IFS component, is a family of contractions $\omega_i: X \to X$, and
2. $\phi = \{\phi_1 \phi_2 \ldots, \phi_N\}$, called the grey level component, is a family of functions $\phi_i$: R→R being Lipschitz, for example, there exists a $K_i \geq 0$ such that $|\phi(t_1) - \phi(t_2)| \leq K_i |t_1 - t_2|$ for all $t_1$, $t_2 \in R$. It is assumed that affine grey-level maps of the form $\phi_1(t) = \alpha_i t + \beta_i$, with $\alpha_i$, $\beta_i \in R$.

A place dependent N-level map (PDIFSM) where M=(ω, Φ) is an IFSM with grey level component $\Phi = \{\phi_1, \phi_2, \ldots, \phi_N\}$, where $\phi_i: R \times X \to R$ is Lipschitz; then it is assumed that $\phi_i$ is an affine grey-level map of the form $\phi_i(t,x) = \alpha(x)t + \beta_i(x) + \gamma_i$ for $\alpha_i \beta_i: X_i \to R$ bounded on $X_i$ and $\gamma_i \in R$. A partitioned N-level map (PIFSM) M=(ω, Φ) is an IFSM where $\omega = (\omega_i)_{i \in N}$ is an N-indexed family of contractions $\omega_i: X_i \to X_{j(i)}$ together with an index map j:N→N, such that $X_{j(i)} \subset X$, and $X_i \subset X$.

Given an IFSM or PIFSM noted above, M=(ω, Φ), a fractal transform operator T:F(X)→F(X) is defined as follows. For each a μ∈F(X) and x∈X, let its N-fractal component $f_i$ be defined as shown in equation (2)

$$f_i(x) = \begin{cases} \phi_i(u(\omega_i^{-1}(x))) \\ 0, \end{cases} \quad (2)$$

$x \in \omega_i(X),$ where $x \notin \omega_i(X).$

Then, in view of the above noted mathematical foundations, the transformed image Tu will be defined as shown in equation (3).

$$(Tu)(x) = \Sigma_{i=1}^{N} f_i(x) \quad (3)$$

Under suitable conditions on the $\omega_i$ and the $\phi_i$ involving their Lipschitz factors, the IFSM operator T is contractive in F(X). Therefore, from Banachs Fixed Point Theorem, there exists a unique fixed point $\bar{u} = T\bar{u}$.

With the mathematical foundations established, it is apparent that fractal image compression is based upon the notion that given a target image $v \in F(X)$, which shall be approximated/compressed to a desirable accuracy $\epsilon > 0$, find an IFSM $(\omega, \Phi)$ with associated/contractive fractal transform operator T such that equation (4) is satisfied, where $\bar{u} = T\bar{u}$ is the fixed point of T.

$$\|v - \bar{u}\|_2^2 < \epsilon \quad (4)$$

The action of operator T may be geometrically viewed in terms of its action on the graph of an image u. Each term $u(w_i^{-1}(x))$ represents a reduced copy of the graph of u, which is supported on the set $w_i(X)$. The grey level map $\emptyset_i$ then distorts this reduced copy in the grey level direction to produce the fractal component $f_i$. The fractal transform adds up these fractal components to produce $(Tu)(x)$. In the resulting fixpoint, the graph of $\bar{u}$ is the union of reduced and modified copies of itself.

The place-dependent IFSM (PDIFSM) generalizes the IFSM method with grey-level maps since the grey level maps $\emptyset_i$ depend on both the grey level value at a pre-image, as well as the location of the pre-image itself. Partitioned IFSM (PIFSM), the basis of fractal block encoding, is based on IFS maps $w_i : X_i \to X_{j_{(i)}}$ that map subset $X_i \subset X$ to a smaller subset $X_{j_{(i)}} \subset X$. The associated partitioned IFSM operator maps modified copies of the image on the $X_i$ onto the $X_{j_{(i)}}$. Thus images are approximated as unions of local copies of themselves, as opposed to copies of the entire image. This is accomplished by partitioning the original image at different scales. Since images usually take the form of a rectangular array of pixels, partitioning the original image into blocks is a natural choice. The blocks are divided into large and small partitions, wherein the large partitions are called domain blocks and the small partitions are called range blocks. The more domain blocks, then the greater the domain pool, and the better the decoded image quality. However, more domain blocks also results in longer compression times, and therefore, requires a more intelligent and efficient algorithm to effectively compress the image.

For the remainder of this disclosure, unless stated otherwise, the following representation is assumed: The image discussed and utilized in the exemplary embodiments is a digital grey level picture. It is generally covered by non-overlapping square range blocks, wherein each range block has a of size n×n, where n represents a number of pixels. The first block is aligned with the bottom left corner of the picture. If the blocks do not reach up to the right or the top edge, then the margin can be covered by rectangular blocks. Next, for every range block, a similar domain block is located. The domain blocks are generally twice the size of the range block, and are located anywhere on the image. The x, y coordinates of the lower left corner of the domain block determine its location. These coordinates can be on each pixel of the image. Blocks are related by an appropriately chosen similarity metric. The primary similarity metrics considered herein are the root-mean-square (rms) and the mean absolute error (mae) metric. Therefore, for blocks $A = (a_i)$ and $B = (b_i)$ with $0 \leq i < m$ the representative equations are shown in (5) and (6).

$$\sqrt{\Sigma(a_i - b_i)2/m} \quad (5)$$

$$\Sigma |a_i - b_i|/m \quad (6)$$

Note that the $a_i$ are obtained as solutions of the differential equation $\partial \Delta / \partial a_i = 0$ in the case where rms is chosen as the similarity metric, which generally amounts to minimizing the positive definitive quadratic form shown in equation (7).

$$\Delta = \sqrt{(a_0 d_{ij} + a_1 - r_{ij})^2} \quad (7)$$

With the mathematical foundations and preliminary definitions set forth, the compression process is generally described as locating a similar and larger domain block for every range block, wherein similarity is judged by a corresponding similarity metric. The transformation parameters corresponding to the located domain block are recorded as the IFS code, and this process is repeated for all of the defined range blocks. Thereafter, the combination of the transformation mappings yield the transformation T, which represents a close approximation of the original image.

The transformation $T = T_v \circ T_G \circ T_c$ is composed from a contraction map $T_c$, followed by a geometric map $T_G$, followed by a grey value map $T_v$. The contraction map shrinks the domain block to half the original size, replacing the 2×2 pixel area by their respective averages. The geometric map is one of the eight flips or symmetries of the square. Therefore, blocks are considered independently of the image. The grey value map also changes the contrast and the brightness by a scale factor $a_0$ and an offset $a_1$ respectively. The domain block $(d_{ij})$ is mapped to $(a_0 d_{ij} + a_1)$. By restricting to the values of $a_0$ to be less than 1, the map T is ensured to be contracting. Although the offset is constant in this case, it is not required to be. Building further upon the aforementioned mathematical principles, define $\Delta$ to be a chosen similarity metric and $\Delta_{D,R}$ to be the corresponding distance from a contracted and/or flipped domain block D to a range block R. Then, the minimum of all differences obtained from the given range block R is represented by equation (8).

$$\Delta_{min}^R = \min_R(\Delta_{D,R}) \quad (8)$$

Therefore, given a range block R, its minimum difference $\Delta_{min}^R$ with every potential domain block must be calculated. The basic compression algorithm operates as shown in equation (9).

For every range block R, For every domain block D,
    Calculate $D_G = T_G \circ T_C(D)$, Determine $\Delta_{min}^R$ for
    $D_G$, Store T with $\Delta_{min}^R$ for R. $\quad (9)$ Further, generally speaking, in order to find a most suitable domain block for a given range block, the range block has to be converted to its corresponding degenerated HC-tree, for example, to a hierarchical node. Therefore, for each range block R in the present exemplary embodiment, construct the l-level hierarchy of abstract subblock vectors $a^l(R) = (a_j)_{j=1 \ldots h^l}$. Although this process has to be performed only once for each range block, it may replay the previous conversion of a potential domain block in order to efficiently utilize computation time.

In order to decode the compressed image, the calculated transformations are applied to an arbitrary initial image, and the process is repeated. Since the transform operator is contractive, the images converge to a stable image, which is the resulting decoded approximation of the original image, now uncompressed.

Therefore, in its most general sense, the compression algorithm of the present exemplary embodiment combines the constructive searching method provided through the use of trees with the efficiency of an abstract and quantitative categorization. As such, the present compression method utilizes the block search strategy of organizing categories of pixel blocks in a hierarchical manner using multidimensional trees. Through the use of multidimensional trees, elements can be arranged in complete order and accessed through a binary search. The binary tree's used in previous embodiments are balanced so that each branch includes a partition in the list into two equal parts, which is effective for indexing and/or searching one-dimensional data sets. However, the characteristics representing images given as grey value maps are multidimensional, and therefore, require more than a binary tree for effective searching and/or indexing. Therefore, as noted above, the classic binary trees of previous embodiments have been replaced with the multidimensional trees of the present exemplary embodiment. In the multidimensional trees of the present exemplary embodiment, elements are considered n-dimensional vectors. Therefore, suitable data structures for searching and/or indexing the multidimensional space are the r-tree, k-tree, and the D-tree. In the r-tree structure, the vectors are organized into a nested set of bounding rectangles, wherein each rectangle can hold a maximum number of nodes. When the maximum number of nodes is exceeded, the node is caused to split in two, which minimizes the total area represented by the bounding rectangles. Therefore, through the use of multidimensional ordered trees, the number of overall range-domain block comparisons necessary to identify an optimally suited domain block for a given range block is minimized. As a result thereof, through the use of multidimensional trees, the time needed to search through potential pairings of image blocks in order to capture the self similarity of the image is dramatically reduced over known search techniques.

In addition to the use of multidimensional trees, the present exemplary embodiment further improves upon known search and compression strategies through the use of a quantitative characterization scheme for pixel blocks that avoids a substantial amount of the unnecessary pixel-to-pixel comparisons that are inherent in the aforementioned existing search strategies. Through the use of categories, an abstract classification of blocks is provided, wherein testing of the blocks is conducted in a more efficient and less time consuming manner. In particular, for example, the HC approach categorizes a given block according to only the mean values and the orientation of the contained quad-tree sub-blocks. Alternatively, in the present exemplary embodiment, in addition to the mean values and orientation information, orthogonal information relative to the differences between pixels is included. Therefore, through the use of multidimensional HC trees, the abstraction of pixels through a qualitative categorization can be iterated, which results in efficiently parsable multidimensional trees. Additionally, unlike previous search and compression algorithms that examine only those domain blocks physically located proximate a particular range block, the present exemplary embodiment uses the multidimensional HC tree search and compression algorithm to examine blocks that are structurally similar to a particular range block. This allows the present exemplary embodiment to maintain high image quality while allowing for dramatically reduced search times.

The actual construction of an HC-tree in the present exemplary embodiment is based a number of factors. First, given a vector s, wherein $s=(s_i)_{i=1\ldots k}$, let the sequence $1\ldots k$ be called a scanline ordering. Therefore, each domain block D is partitioned into a vector of equally-sized subblocks $s(D)$, wherein $s(D)=(s_i)_{i=1\ldots k}$, which is termed the subblock vector. Thus, given a domain block D, its subblock vector $s(D)=(s_i)_{i=1\ldots k}$, and the contraction factor $\chi$ such that $k=h*\chi$, the abstract subblock vector $a(D)$ is the vector $(a_j)_{j=1\ldots h}$, where each component $a_j=(m_j,v_j)$ consists of the average $m_j$ and the difference $v_j$ of $(s_i)_{(j-1)*\chi<i<j*\chi}$, respectively. Therefore, given an abstract subblock vector $s=(s_i)_{i=1\ldots k}$ with $s_i=(m_i,v_i)$ and the contraction factor X such that $k=h*\chi$, its abstract subblock vector $a(s)$ is the vector $(aj)_{j=1\ldots k}$, where each component $a_j=(m_j,v_j)$ consists of the average $m_j$ and the difference $v_j$ of $(m_i)_{(j-1)*\chi<i<j*\chi}$, respectively. Then the orientation of an abstract subblock vector a is its scanline ordering reordered with increasing differences.

With the establishment of the notion of a multidimensional tree (r-tree, D-tree, etc.), the establishment of the initial block partitioning, and the establishment of the contraction factor(s), the actual HC-tree is the result of a standard tree construction, which is generalized in FIG. 1. FIG. 1 illustrates an initial part of a HC-tree induced from the quadrant of pixel values 14 (s111, s112, s113, and s114) in the first level 11 of the figure. This quadrant of pixels 14 is then represented in the second level 12 of the figure by the quadrant of numerical values 15 illustrated in the exemplary embodiment as (m11, d11), (m12, d12), (m31, d31), and (m41, d41), wherein m represents the medium value of the corresponding pixel level and d represents the variance value of the corresponding pixel level. Finally, the quadrant of numerical values 15 is represented as a quadrant of subblock vectors 16 (a1, a2, a3, and a4) in the third level 13 of the figure, wherein a1=(m1, d1), a2=(m2, d2), a3=(m3, d3) and a4=(m4, d4). Therefore, upon review of the progression from the first level 11 to the third level 13 illustrated within FIG. 1, it is apparent the given a set of domain blocks along with its corresponding subblock vectors, the representative HC-tree is the multidimensional tree iteratively constructed from the correspondingly induced abstract subblock vectors. These trees are termed multidimensional, as the branching is based on abstract subblock comparison. Additionally, in a fractal based codec, domain blocks and range blocks are related under affine transformations. However, through the use of the exemplary configuration, the use of normal precomputation algorithms is complicated, as a normalization may not rely on information on specific range blocks, as is usually the case in fractal based compression operations. In order to counter this complication, the orientation has been added as a precomputed value. Turning back to the HC-tree structure, the root node of an HC-tree represents an abstract view on the original blocks from which the tree was constructed. Going from some leaf to the root node means an increasingly abstract and decreasingly concrete view on the block represented by that leaf. Alternatively, when going from the root node to a particular leaf node means narrowing down an abstract description of a partial image to a concrete representation.

While discussing the construction of the HC-trees, it is also beneficial to briefly discuss domain and range blocks. Since the analysis of a gray level component of the original image is based on a fixed block structure, fractal image-based compression algorithms seek self-similarity between larger parts and smaller parts of the given image. The smaller parts form an initial partition of blocks called range blocks, which are generally square or rectangle. By definition, every pixel within the given image is included in exactly one range block. The first range block is aligned with the bottom left corner of the image, and if the range blocks do not extend to the right or the top edge, then the margin can be covered by rectangular blocks. The larger and carefully selected blocks are termed domain blocks. It is desirable to generate larger domain blocks, as the larger the domain blocks are allowed to be, the greater the compression ratio produced. Aside from the size of the domain blocks, the goal of the compression process is to most quickly find a closely matching domain block for every range block, and upon finding a similar block, storing the corresponding fractal transform. As an example of the creation and use of domain and range blocks, the present exemplary embodiment using HC-trees starts from range blocks initially being of size 32×32 pixels. These range blocks are then refined down to 24×24, 16×16, 8×8, 6×6, and finally to 4×4 pixels, as shown in FIG. 1, assuming that sufficient quality matches can be found between the respective blocks. After refining, the HC-tree approach implements a partial tree partitioning operation, wherein given a range block, the search of a matching domain block may fail, and therefore, in this case, the range block is recursively replaced by a covering set of smaller range blocks. Domain blocks may overlap each other, and need not cover every pixel within the respective image. The domain blocks in the exemplary embodiment are generally twice the size of the range block, and are located anywhere on the image. However, various sizes of domain blocks are contemplated within the scope of the present invention. Nonetheless, domain blocks are inherently restricted to a number of reasonable sizes. Although larger domain blocks yield a more efficient matching of range blocks, a larger domain block is also more specific, and thus, more difficult to be matched. Therefore, the potential contribution from a larger domain block is less probable. Experimental data on the present exemplary embodiment have revealed that block sizes selected from the following set of {4, 6, 8, 12, 32, 64} pixels in each dimension have been effective in the present exemplary embodiment. The x, y coordinates of the lower left corner of the domain block defines the location of the domain block on the respective image, which can be on each pixel. The set of all domain blocks, when considered as a whole, is termed the domain pool.

The determination of the best matching domain and range blocks is generally determined by the particular distance metric chosen. Both the rms and mae distance metrics been found viable, and further, wavelet coefficients provide an alternative to rms and mae. More particularly, for HC-tree operations such as insertion and comparison, each node of the HC-tree is considered as a position vector in a corresponding r-tree, and its orthogonal basis is the Cartesian product of all abstract subblock vectors describing the original pixels in an increasingly concrete manner. The distance between two of these vectors is measured by an appropriately chosen distance or similarity metric. For purposes of example, consider the subblock vectors $A=(a_i)$ and $B=(b_i)$ with $0 \leq i \leq m$. When vector bases are equal in type, the primary similarity metric is the rms metric, which is defined by equation defined by equation (10).

$$\Delta_{A,B}^{rms} = \sqrt{\Sigma(ai-bi)^2/m} \quad (10)$$

The mae metric is defined by equation (11), and generally offers the least computational efforts.

$$\Delta_{A,B}^{mae} = \Sigma(ai-bi)/m \quad (11)$$

A wavelet (wvl) metric, $\Delta_{A,B}^{wvl}$, using the wavelet coefficients of a corresponding, fixly chosen wavelet filter provides a further option. The crucial point of each of the aforementioned equations is the fact that comparing two blocks requires a computational process involving all pixels, which is similar to the traditional r-tree approach, wherein the results of the computation are used in a series of average and variance comparisons, termed naive extension. However, introduction of the HC-tree utilizes the advantages of these methods, while also following the principle idea of pruning the computation as soon as possible. In practice, this means that node insertion usually uses the complete set of information in order to guarantee that neighboring nodes in the tree are structurally close as intuitively expected. However, as discussed in the domain-range block pairing process, computation of distances proceeds from abstract to concrete components, stopping as soon as a reasonable decision is found.

Therefore, in general terms, the comparison each node of the HC-tree will be considered as a position vector, and its orthogonal basis represents the list of averages and differences reordered according to the orientation of the subblock vector. Matching each range block tree onto the precomputed domain block tree begins with the most abstract level. The HC-range block node is compared with a corresponding node in the HC-domain tree. This results in the selection of some certain domain blocks and the search continues recursively on the next level until finally a single domain block is located together with the required transformation parameters. Embedding the HC-tree into the principal domain-range search algorithm noted above leads to equation (12).

Precompute HC-domain tree $Tree_D$ For every range block R, construct a HC-range tree $Tree_R$ Match $Tree_R$ $Tree_D$ and locate optimal domain block D(R) Store transformation T for D(R) (12)

The process of matching $Tree_R$ $Tree_D$ includes locating the optimal domain block for a given range block, wherein a hierarchical approach is used. First, both normalized domain and range blocks are compared on the very abstract level. Domain blocks corresponding poorly to the range block are dropped at this early stage, and positive comparisons are reevaluated in subsequent, more detailed comparisons. It should be noted that the HC-approach does not only reduce the overall number of block comparisons, but in particular the number of operations involving pixels, which is required if every single pixel belonging to a block must be considered for determining the result of a comparison. Matching each range block tree onto the recomputed domain block tree begins with the most abstract level. The HC-range block node is compared with a corresponding node in the HC-domain tree. This results in the selection of some certain domain block son and the search continues recursively on the next level until finally a single domain block is located together with the required transformation parameters.

Therefore, the domain and range comparison phase is preceded with a precomputation phase in which all domain blocks are organized into a single domain tree $Tree_D$. The quality of the comparison algorithm is a result of each comparison on an individual level involving a much smaller number of details, and therefore, fewer operations are necessary, as the result of each comparison on a particular level contributing to further searches. Further, through the use of variances rather than average mean values, the emphasis is placed upon structural similarities, which inherently introduces a qualitative aspect to the present invention. Additionally, precomputed average values allow for an easy determination of the offset value for the transformation, and precomputed orientations ensure that range blocks of different orientations may be compared in a flexible manner.

Furthermore, since there are almost certainly going to be redundant entries within each HC-tree, each branch of the HC-domain tree can be restricted to a certain number of nodes without seriously degrading the available variety. Therefore, in the interest of efficient processing, new blocks are generally inserted into the HC-domain tree only if the differences, of the corresponding HC-nodes are within the limits of a predetermined scheme. Remembering that the HC-domain tree is constructed bottom-up, which is illustrated by the progression from finer details to abstract representations as you go up through the tree, the tree can be pruned in a top-down manner by identifying abstract nodes which are of sufficient similarity as to eliminate one node from the tree. The pruning process of the HC-trees may also be conducted depending on the pixel distributions of abstract subblock vectors. More particularly, for capturing edges, blocks with highest differences selected from 4×4, 8×8, and 12×12 sizes, for example. For moderate texture, blocks with mid range differences selected from 12×12, 16×16, and 32×32 sizes, for example. For smooth areas, for example, blocks with lowest differences selected from 16×16, 32×32 and 64×64 sizes. This heuristic is based upon on the nearly intuitive observation that while large blocks can successfully cover smooth areas of an image, smaller blocks are required illustrate more defined and sharp edges.

In order to more formally present the notion of an HC tree, introduction of some auxiliary definitions based on r-trees is required. First, let T[S] be an r-tree (r*-tree) constructed from a given set of vectors S, and the level of a tree is, as expected, the level of its element vectors. Therefore, for each node $n \in T^j$, let $C(n) \in A_j$ be the set of all abstract subblock vectors that are direct or indirect branch nodes of n. Further let $C^-(n)=\{a_{j-1}(D) \in a_{j-1} | a_j \in C(n)\}$ be the set of corresponding subblock vectors which are one level less abstract. With these foundations set, let $T^-(n)=T[C^-(n)]$ be the correspondingly generated tree, and then each leaf node in $T^l$ is considered to be of level 1, and each node having a branch node of level n has level n+1.

Figure 2:
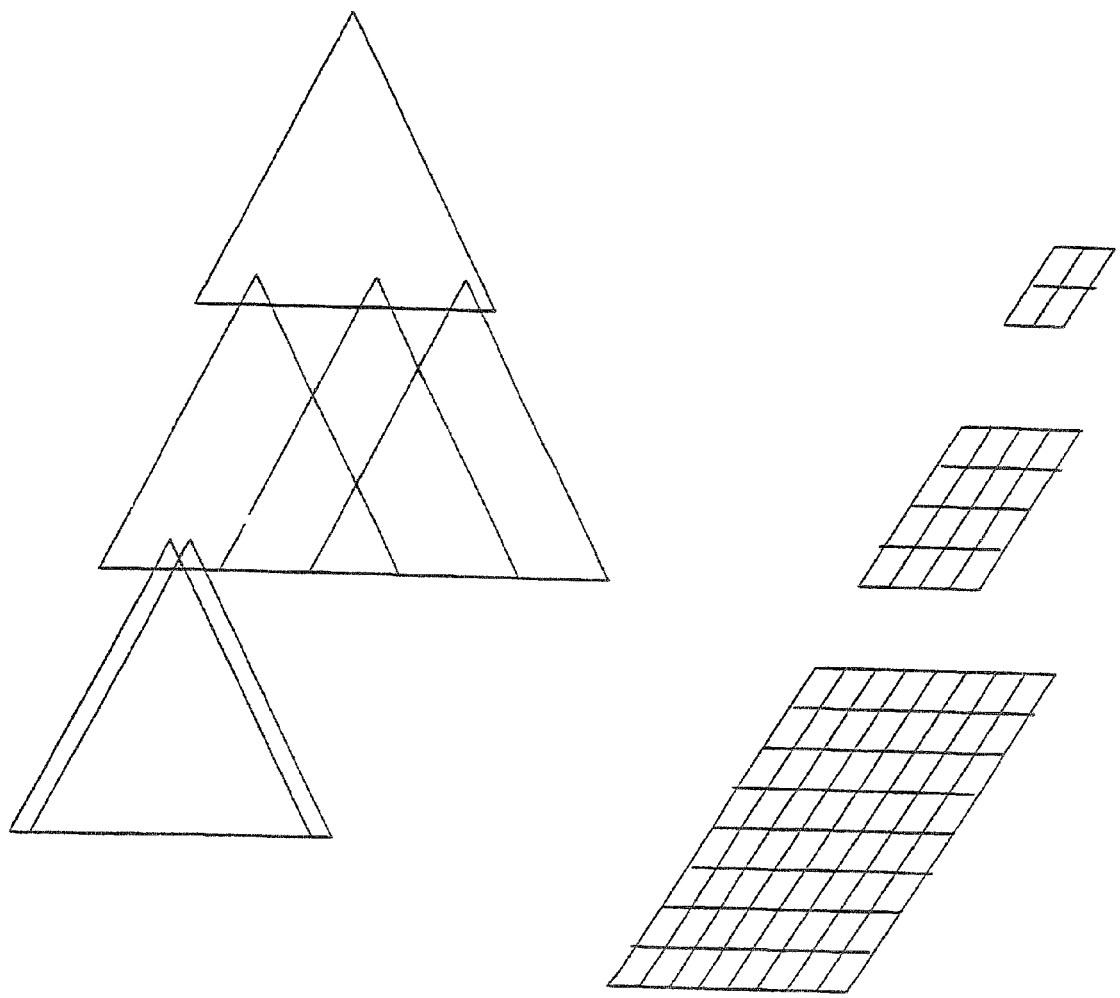
FIG. 2 is a second general illustration of HC tree construction.

Therefore, in view of the domain pool and its abstract views, the HC-domain tree is the tree T constructed according to the following scheme, as shown in FIG. 2. First, construct the r-tree $T^h=T[A^h]$ generated from the set of most abstract subblock vectors. As a consequence the generators become the leaf nodes of $T^h$. Given a subset of nodes $N \subset T^l$, an HC-tree is the original level $l$ tree where each $n \in N$ is associated with a level l−1 tree $T^-(n)$. Thus, an HC-tree is a tree which on the top consists of very abstract nodes, and moving downwards through the tree will eventually lead to a selected node that is associated with a new, less abstract tree. This new tree can be considered as an ordered replacement of more detailed versions of the original subtree of that node. On the abstract level the set N may intuitively be identified with the set of leaf nodes, and on the less abstract level, it may include the leaf nodes and it's immediate branches.

Upon determination of a range block R, the HC-tree fractal compression algorithm of the present exemplary embodiment seeks the domain block D such that their difference $\Delta_{min}^R$ (modulo a simple transformation) becomes minimal. More precisely this means to look for a transformation T, which when applied to R, yields an optimal approximation of D. The HC-approach of the present exemplary embodiment utilizes the following transformations. Given a pixel p, which is within R, its associated value q, which is within D, is computed by applying the transformation $t^i$, where $q=t^i p$. Beginning with a simple linear transformation means that each of the transformations $t^i$ is composed from a scaling factor $S^i$ contraction map, a rotation $r^i$ geometric map, and an offset $o^i$ gray value map, wherein equation (13) holds true.

$$q = s^i r^i p + o^i \tag{13}$$

Equation (13) must be solved over three-dimensional space where the x and y components refer to the 2-dimensional localization, and the z portion refers to the gray value intensity. In order to solve equation (13), a matrix operation is conducted, which is represented by equation (14).

$$\begin{bmatrix} q_x \\ q_y \\ q_z \end{bmatrix} = s^i r^i \begin{bmatrix} p_x \\ p_y \\ p_z \end{bmatrix} + \begin{bmatrix} o_x \\ o_y \\ o_z \end{bmatrix}^i \tag{14}$$

The scaling encoded by $s_z$ and $s_y$ actually comprises scaling along the x and y axis, thus mapping a domain block to a somewhat smaller range block. Further, scaling the contrast determined by $s_z$; rotation factors $r_z$ and $r_s$, are used to describe rtating and mirroring Therefore, in view of the supporting mathematical background presented above, the code for the partial IFS representation of an image basically consists of a sequence of tuples, one per range block, wherein equation (15) holds true.

$$t^i = (s_x^i, s_y^i, s_z^i, r_x^i, r_y^i, o_x^i, o_y^i, o_z^i) \tag{15}$$

Scaling factors $s_z$ and $s_y$ are limited to the possible relations between the standardized sizes of domain blocks and matching range blocks. Rotation factors are limited to one of the 8 possible symmetry operations encoding clock-wise rotations around the center by 0, 90, 180, and 270 degrees as well as mirroring about the horizontal and vertical median and diagonal axes. Rather than initializing the image with the typical mean gray value, but for speeding up the convergence of the decomposition process, $o^i$ is initially be set to the mean value of a range block, rather than the relative offset from the corresponding domain block in the present exemplary embodiment.

Returning to the discussion relative to domain and range blocks in greater detail, with regard to the formation of a domain pool, as noted above, the notion of abstract pixels forming abstract subblock vectors is based upon averages and differences. The average value of a block A where $A=(a_i)$ with $0 \leq i < m$ is taken to be av(A), wherein $$\frac{1}{m} \sum_{m-1}^{i-0} (a_i - b_i).$$

Therefore, as a principal notion of difference, the variance $$\text{var}(A) = \frac{1}{m} \sum_{m-1}^{i-0} (a_i - av(A))2 \text{ is used.}$$

Mathematical foundation aside, preparation of the domain pool initially includes selecting domain blocks at positions that are integral multiples of four, in the present exemplary embodiment, which are 4, 6, 8, 16, 24, 32, and 64 pixels wide in each dimension, in addition to any supplemental rectangular blocks possibly needed to cover the margins. Domain blocks are normalized with respect to their orientation, which is measured by the average values of its subblocks, and then storing the corresponding rotation factor. Further, domain blocks are normalized with respect to their medium gray level, and the corresponding offset is stored.

In constructing the domain blocks, abstract views on a domain block are generated through the notion of abstract subblock vectors. In particular, each domain block D is partitioned into a vector of equally-sized subblocks $s(D) = (s_i)_{i=1 \ldots k}$ where k=4 for blocks being at least 32 pixels wide and k=2 otherwise in the present exemplary embodiment. The progression of abstraction is covered by the contracting factor X; which is generally x=2 or 3 are the most efficient choices for the present exemplary embodiment. Therefore, given a domain block D, its subblock vector $s(D) = (s_i)_{i=1 \ldots k}$, and the contraction factor $\chi$ such that $k = h * \chi$, the abstract subblock vector a(D) of level 1 is the vector $(a_j)_{j=1 \ldots h}$ where each component $a_j = (m_j, v_j)$ consists of the average $m_j$ and the difference $v_j$ of $(s_i)_{(j-1)*\chi \leq i \leq j*\chi}$ respectively. Further, given an abstract subblock vector $s = (s_i)_{i=1 \ldots k}$ of level 1 with $s_i = (m_i, v_i)$ and the contraction factor $\chi$ such that $k = h * \chi$, its abstract subblock vector a(s) of level 1+1 is the vector $(a_j)_{j=1 \ldots h}$ where each component $a_j = (m_j, v_j)$ consists of the average $m_j$ and the difference $v_j$ of $(m_i)_{(j-1)*\chi \leq i \leq j*\chi}$ respectively. Then for each domain block D, let $a(D) = (a_l(D))_{l=1 \ldots h}$ be the hierarchy of its abstract subblock vectors of level 1, and let $A = (A_l)_{l=1 \ldots h}$ be the hierarchy of subblock vector sets $A_l = \{a_l(D) | D \text{ is domain block}\}$.

The foundation of the audio portion of the compression in the present exemplary embodiment utilizes the following primary components. A filter band decomposition is used, and in particular a WP transform is used as the filter bank decomposition tool. A 42-band decomposition filter bank tree structure is used in the present exemplary embodiment to give a non-uniform decomposition that closely matches the critical bands given by a psychoacoustic model. The psychoacoustic masking model, which is a simplified perceptual masking model, is employed here to reduce computational expense. The masking thresholds applied to filter bank signals depend on the frequency bandwidths of the critical bands. As such, the present exemplary embodiment uses a series of different length Daubechies wavelet filters in different locations within the WP decomposition tree. A quantization step is used, wherein an individual scaling factor for each of the 42 frequency bands is used. These are determined adaptively for each frame of the audio signal from an iterative analysis of the quantization noise and masking threshold obtained from the perceptual masking model. Therefore, generally speaking, the audio coder uses the concept of wavelet-packets with psychoacoustic adaptive quantization. There are generally three components in this exemplary psychoacoustic perceptual audio coding algorithm: filter bank decomposition, psychoacoustic masking, and quantization.

With greater particularity, the WP transform used in the audio portion can be implemented with an iterated 2-channel filter bank which is repeatedly applied not only in the lower half band but also in the higher half band yielding any desired dyadic tree structure of subbands. Assume the low and high pass filters used in the standard wavelet transform are H0 and H1, with coefficients $l_n$ and $h_n$ respectively. The even and odd numbered WPs $W_{2m}(t)$ and $W_{2m+1}(t)$ are defined by equations (16) and (17)

$$W_{2m}(t) = \sqrt{2 \sum_n l_n W_m(2t - n)} \tag{16}$$

$$W_{2m}(t) = \sqrt{2 \sum_n h_n W_m(2t - n)} \tag{17}$$

The 42 band tree of the present exemplary embodiment is intended for 44.1 kHz sampled audio. The tree structure can be deduced from the column showing the WP Decomposition Tree Passbands. An important aspect of applying a WP decomposition filter bank in audio coding is that the quality of the system depends heavily on the choice of the analyzing wavelet used. As the length of the wavelet function increases the corresponding filter transition bandwidth decreases. Consequently, a better separation between the subband signals is gained and higher compression of the wideband signal results. However, a longer impulse response increases computational effort and coding delays. Since lower order filters can achieve satisfactory separation at lower frequencies and help reduce coding delay, the present invention compromises by using different length, maximally flat Daubechies wavelets in different parts of the WP decomposition tree. The present invention further uses shorter Daubechies filters in lower frequency subbands and longer filters for higher frequency subbands.

Frames provide the reference units for a certain number of samples. Only the difference between the neighboring frames is transmitted in the present exemplary embodiment. In selecting a suitable frame size the present invention compromises between two conflicting requirements. A large frame size is desirable for maintaining lower bit rates. Unfortunately, larger frame sizes also lead to poorer quality because of the non-stationarity of audio signals. In the coder of the present exemplary embodiment, a standard frame size of 2048 samples (about 46 ms at 44.1 kHz sampling rate) is employed. The two ends of each frame are weighted by the square root of a Hanning window size 256 (i.e., every two neighboring frames overlap by half of this amount). Use of the square root of Hann0ing window provides a lower frequency leakage and higher resolution than the Hanning window used in MPEG.

The quantization portion of the audio codec is done using a scale factor table of 42 values, one for each of the 42 frequency bands. The 42 quantization factors are determined adaptively for each frame of the audio signal from an iterative analysis of the quantization noise and masking threshold obtained from the perceptual masking mode. After the WP transform has been applied, the next step is quantization of the WP transform coefficients. Quantization is of critical importance in reducing the resultant t bit-rate. An adaptive scalar quantization table method is applied in our audio coder, with a different quantization number applied to each of the 42 subbands. The scale factor for each subband must be chosen with great care to ensure that the reconstruction error due to quantization remains below the masking curve, which is indicated by equation (18)

$$\sum_{k=1}^{M} E k |\delta \kappa(\omega)|2 \leq \varphi(\omega), \tag{18}$$

where $\delta_K(\omega)$ denotes the frequency response of the kth subband of the WP transform. $E_k$ is the quantization noise power and M=38 is the number of WP subbands. It is worth noting that $\psi(\omega)$ denotes the power for density spectrum of the masking curve which is actually a piecewise constant function equal in each critical band to the corresponding masking threshold determined below.

After filter bank decomposition, the audio signals are transmitted into a psychoacoustic masking model which identifies redundant audio information, and quantization is then applied. Masking is a frequency domain phenomenon whereby a weak signal, the maskee, is made inaudible by the presence of a simultaneously occurring stronger pure tone signal (the masker), if they are close enough to each other in frequency. The masking threshold depends on the sound pressure level (SPL), the frequency of the masker, and the characteristics of masker and maskee. The frequency ranges used in the current filter bank tree are given in the first two columns of the table above. The shape of the masking threshold of a pure tone at frequency f can be approximated by the formula in Table 3 where $f_{masker}$ and $f_{maskee}$ are the frequencies of the masker and the maskee signals respectively. $T_{max}(f_{masker})$ is the relative masking threshold at this frequency. The masking threshold for a maskee is obtained by multiplying the power of the maskee by $T(f_{masker}, f_{maskee})$ Therefore, for an input signal frame, we calculate a masking threshold for each critical band as follows. First, the power S(f) of each frequency f in the Fourier domain is estimated by apply a Fast Fourier Transformation (FFT) to the input signal frame. Then the masking threshold $\chi_{thresh}(F)$ for a critical band F is determined. To determine the masking threshold for each frequency component f∈F, we must let equations (19), (20), and (21) be satisfied, $$Xf = \sum_{f_{master}=0}^{f_{Nyquist}} T(f_{masker}, f) S(f) \quad (19)$$

$$X_{min}(f) = \min\{X(f) \mid f \in F\}. \quad (20)$$

$$X_{thresh}(f) = \min(X_{min}(F), T_{abs}) \quad (21)$$

where $T_{abs}$ is the absolute listening threshold in F taken from the ISO/IEC MPEG standard's absolute threshold table. Masking effects do not only occur in the frequency domain, but also in the time before and after a masking sound. It has empirically been shown that the premasking effect, also known as preecho, may last 10 ms and can only be ignored if the masking sound is shorter than two milliseconds. Preechos are eliminated by low-pass filtering frames containing them before they are transmitted. The masking threshold frequency os represented by equation (22)

$$T(f_{masker}, f_{maskee}) = \begin{cases} T_{max}(f_{masker}) \left(\dfrac{f_{maskee}}{f_{masker}}\right)^{28} & f_{maskee} \leq f_{masker} \\ T_{max}(f_{masker}) \left(\dfrac{f_{maskee}}{f_{masker}}\right)^{-10} & f_{maskee} > f_{masker} \end{cases} \quad (22)$$

Figure 3:
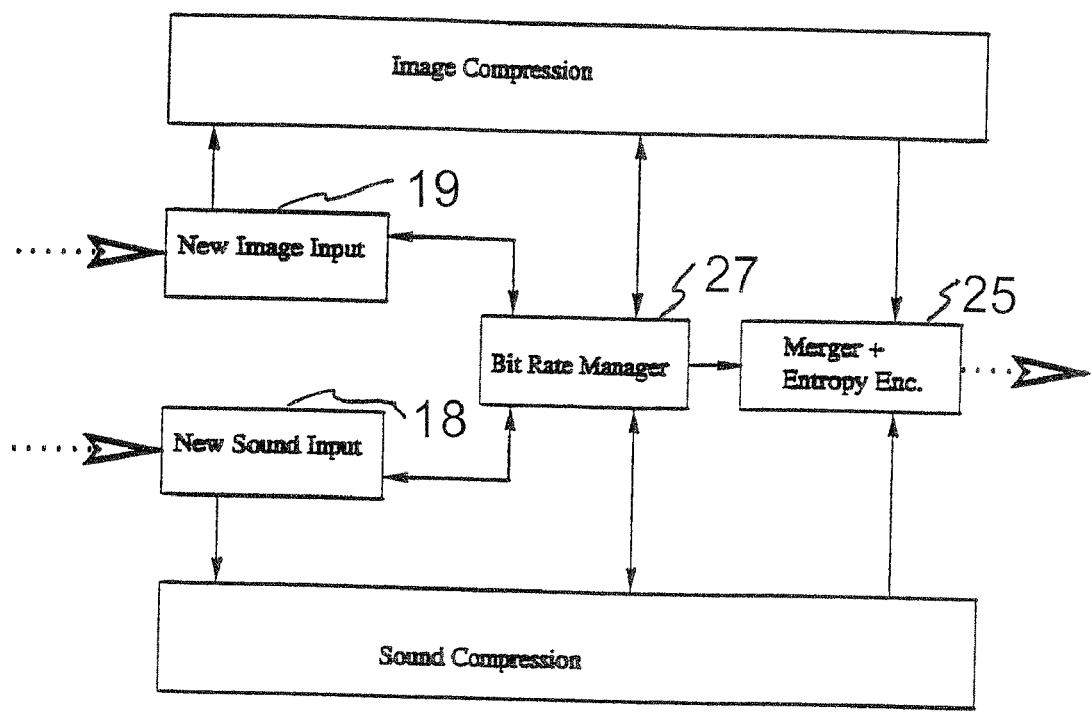
FIG. 3 is an exemplary illustration of the main structure of the present invention.

In application, the multimedia compression algorithm discussed above is generally shown in the exemplary embodiment illustrated in FIG. 3. Image and sound data is received on separated input channels 18 and 19, and is then forwarded to corresponding compression modules. The corresponding output is then merged and entropy encoded with variable run length encoding by merger and entropy module 25. Processing in each of the modules is supervised by the global bitrate manager 27, which is configured to dictate the pace of compression and to merge the resulting compressed video and audio signals according to the available bitrate. This typically involves load balancing of audio and video signals and/or quantization of the compressed signals.

Since the present exemplary embodiment targets low bitrate applications, it is necessary to code frames sequentially with conditional block replenishment. Generally speaking, frames are therefore transmitted in an order-preserving manner where the coding the current frame relies on that of the previous one. Range blocks for the current frame are mapped to domain blocks of the previous frame. Depending on the available bitrate, an adjustable filter will then select only those blocks with the highest interframe error for transmission. Due to the fact that the image is not periodically refreshed as a whole, there is no refresh rate associated with the output frame. Color is represented in the Y-U-V format, and both the U and V images are subsampled by a factor of 2 in each direction in the present exemplary embodiment. The color blocks are generally updated at the same time as the corresponding luminance blocks. After the data to be transmitted has been quantized, a final entropy coding is added. A time record is kept, since each of the transmitted blocks is updated every time a block is selected for transmission.

Figure 4:
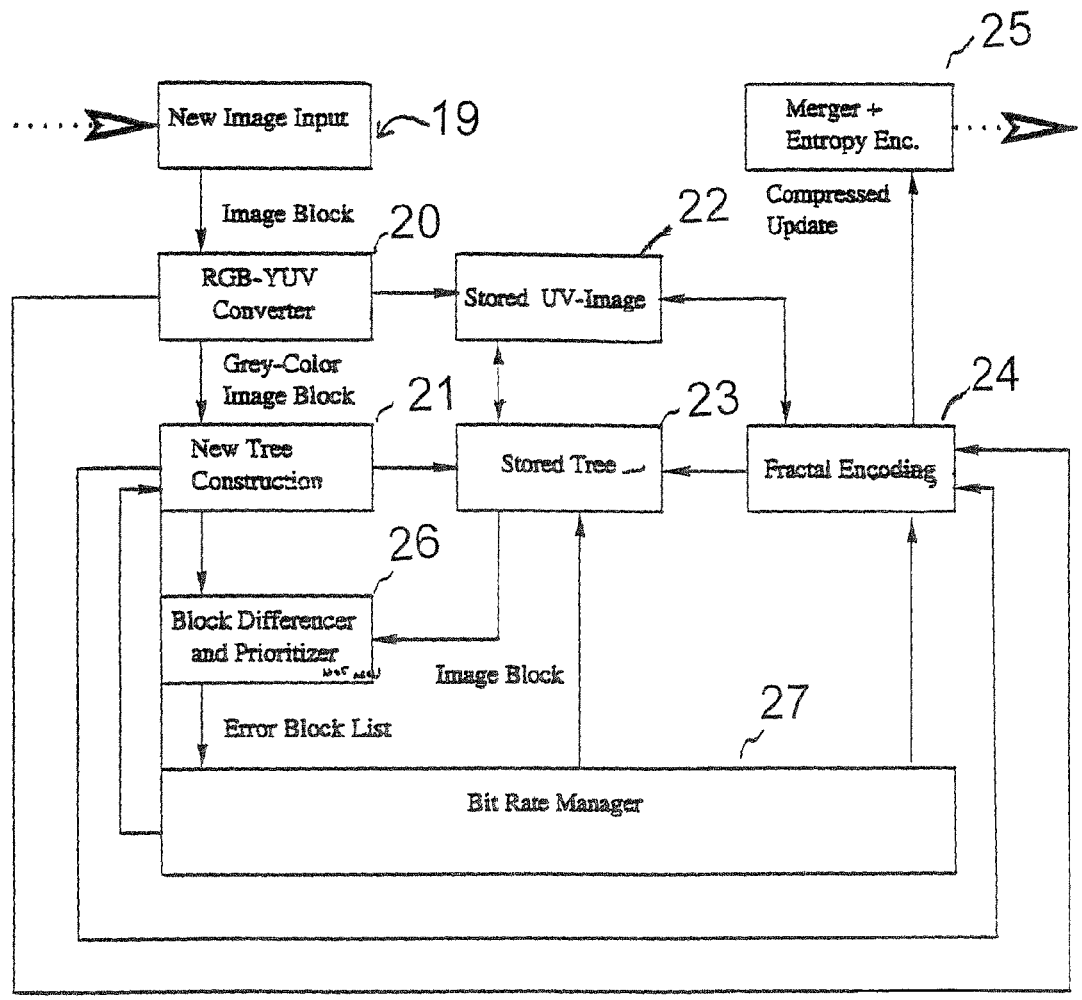
FIG. 4 is an exemplary illustration of the image compression portion.

A general illustration of the image portion of the encoding scheme of the present exemplary embodiment is shown in FIG. 4. In operation, the image to be compressed is received in the new image input module 19. Upon entry of the color image into the compression module of the present exemplary embodiment, the color image is transmitted to the RGB-YUV module 20. In RGB-YUV 20 color images are represented in the Y-U-V format, and both the U and V images are subsampled by a factor of 2, for example, in each direction. A such, the color portion of the image is essentially separated from the black and white portion of the image. The color blocks are updated at the same time as the corresponding luminescence blocks. RGB-YUV 20 transmits the UV portion of the image to storage unit 22, while the remaining RGB portion of the image is sent to the new tree construction module 21, where the HC-tree for the image is constructed from an abstract view of a number of pixels, which is recursively repeated, as discussed above. Once the HC-tree is constructed, the tree is transmitted to stored tree module 23, wherein the constructed tree is stored. Additionally, the constructed HC-tree transmitted to the block differencer and prioritizer module 26, where similar branches of the HC-tree are combined in order to increase the efficiency of the compression process, as discussed above. Further still, the constructed HC-tree is transmitted to the fractal encoding module 24, where the fractal mapping for the image and/or the corresponding tree is computed. Fractal mapping module is additionally in connection with the storage unit 22, stored tree module 23, and RGB-YUV converter 20, and therefore, is capable of receiving input from each of these modules for processing in the fractal encoding operation. Bit rate manager 27, which is on connection with each module of the compression device, operates to prioritize the operations and transmission of information within the compression device. In particular, if bit rates are low, then bit rate manager 27 operates to tailor audio and video in order to guarantee the maximum quality of multimedia transmission given the particular bandwidth, Merger and entropy coder 25 accepts the audio and image data from the corresponding modules shown in FIG. 3 (and detailed in FIG. 4 and FIG. 5), and in accordance with tactical information provided by bit rate manager 27, the audio and image data are joined as a single stream and quantized. Then the entropy portion of merger and entropy module 25 performs a final non-content specific compression algorithm thereto before the stream is sent to a transmission module.

Figure 5:
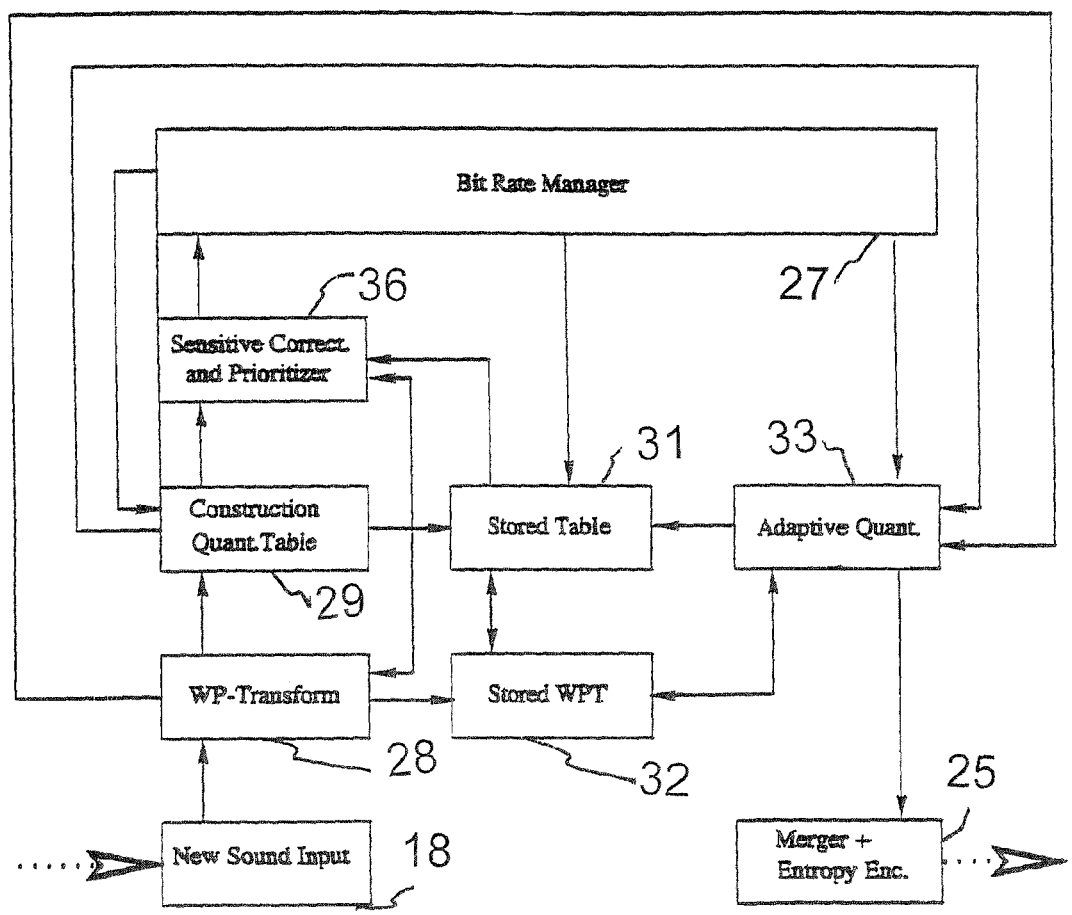
FIG. 5 is an exemplary illustration of the audio image compression portion.

FIG. 5 illustrates an exemplary configuration of the sound compression portion of the present exemplary embodiment. As shown in FIG. 3, the audio portion of the multimedia data is received by sound input module 18, and then forwarded to the WP transform module 28. WP transform module is in connection with the stored WPT module 32, the sensitive correction and prioritizer module 30, and the adaptive quantizer module 33. The primary function of WP transform module 28 is to implement a filer bank decomposition tool. In particular, in the present exemplary embodiment,
WP transform module 28 implements a 42 band decomposition filter bank tree structure designed to result in non-uniform decomposition that closely matches critical bands given by a psychoacoustic model. After the new sound frame has been analyzed by the WP transform module 28, it is quantized according to the corresponding noise level in quantization module 29. This quantization process involves using an individual scaling factor for each of 42 frequency bands in the present exemplary embodiment. These are determined adaptively for each frame of audio from an iterative analysis of the quantization noise and masking threshold obtained from a perceptual masking model. The quantization coefficients are then stored in table module 31, and only the differences between the quantization tables for neighboring frames are actually transmitted. The resulting information is then sent to the merger and entropy module 25 for merging with the image portion of the multimedia data.

Decoding of the compressed multimedia data at the receiver end is accomplished by s simple dequantization step followed by the inverse WP transform to obtain the reconstructed signal. However, the expansion of the image requires joining the image data on which the actually displayed frame is based, and the differences currently received, before the fractal decompression process may be preformed on those regions that need to be updated. Similarly, sound data is combined with the audio still present from the preceding frame, and then the dequantization step and inverse WP transform are applied.

In view of the configuration of the present exemplary embodiment, there is an inherent priority between the image and audio portions of the multimedia transmission. In particular, the priority between the image and sound portions is decided in accordance with a few simple principles. These principles illustrate that basic audio flow receives a top priority, since audio delays are known to be more perceptible than image delays. However, as stated above, the present invention is provided in order to propagate the entire multimedia stream with the least amount of delay and/or errors as possible, therefore providing a smooth image and accompanying audio over a generally available bandwidths.

In view of the fact that CPU speeds generally exceed the network processing speeds, a part-wise comparison of actual and preceding image and audio data is costly, and therefore avoided, as long as dropping the logical frame rate remains a viable option in view of image quality concerns. With particular regard to image data, this is generally the case down to 30% of the targeted frame rate, and if the frame rate drops below this threshold, only those parts of an image where changes occur are actually sent.

Additionally, although the exemplary embodiment discussed above illustrates an audio and image compression units operating in cooperation for form a comprehensive multimedia compression device, it is also contemplated within the scope of the present invention to separate the audio compression portion from the image compression portion of the above illustrated exemplary embodiment, thereby creating a stand alone image compression unit using multidimensional hierarchical categorization trees and a stand alone audio compression unit using filter bank decomposition.

Although the invention described in the present exemplary embodiment has been illustrated in a hardware configuration with a plurality of modules, it is expressly contemplated within the scope of the present invention to implement the present invention through software alone, or through a combination of hardware and software. Furthermore, although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A computer assisted apparatus for transmitting multimedia, said computer comprising a processor, said apparatus comprising:
    an image compression unit for compressing, via the processor, an image portion of a multimedia data frame;
    an audio compression unit for compressing an audio portion of the multimedia frame;
    a bit rate manager in communication with said image compression unit, and said audio compression unit for controlling frame flow; and
    a merger unit in communication with each of said image compression unit and said audio compression unit for merging a compressed image portion and a compressed audio portion into a single compressed multimedia frame,
    wherein the image compression unit utilizes R-Tree-based multidimensional hierarchical categorization trees to compress said image portion, and
    wherein the R-Tree-based multidimensional hierarchical categorization trees examine pixel blocks that are structurally similar to a reference block, and organize pixel blocks in a hierarchical manner.

2. An apparatus for transmitting multimedia as recited in claim 1, wherein the image compression unit is further configured to use the R-Tree-based multidimensional hierarchical categorization trees in a fractal coding environment to compress said image portion.

3. An apparatus for transmitting multimedia as recited in claim 1, wherein said audio compression unit is configured to execute a filter bank decomposition operation to compress the audio portion of the multimedia frame.

4. An apparatus for transmitting multimedia as recited in claim 3, wherein said filter bank decomposition operation further comprises a wavelet packet transform.

5. An apparatus for transmitting multimedia as recited in claim 1, wherein said image compression unit further comprises:
    an image converter for separating a UV portion from an RGB portion;
    a tree construction unit in connection with the image converter for constructing the R-Tree-based multidimensional hierarchical categorization trees;
    a block differencer and prioritizer unit in connection with the tree construction unit for optimizing the R-Tree-based multidimensional hierarchical categorization trees;
    at least one storage unit in connection with the image converter and the tree construction unit for storing at least one of a UV portion of the multimedia image and the R-Tree-based multidimensional hierarchical categorization trees;

a fractal encoding unit in connection with the at least one storage unit for executing a fractal encoding operation based upon the R-Tree-based multidimensional hierarchical categorization trees; and a control unit in connection with the at least one storage unit, the image converter, the tree construction unit, the fractal encoding unit, and the merger unit for regulating the operation of the apparatus.

6. An apparatus for transmitting multimedia as recited in claim 1, wherein said bit rate manager is further configured to prioritize information generated by the apparatus and to minimize perceivable deficiencies.

7. An apparatus for transmitting multimedia as recited in claim 1, wherein said image compression unit further comprises a R-Tree-based multidimensional hierarchical categorization tree construction unit, wherein said R-Tree-based multidimensional hierarchical categorization tree construction unit is configured to construct at least one R-Tree-based multidimensional hierarchical categorization tree that is representative of the image portion of the multimedia frame.

8. An apparatus for transmitting multimedia as recited in claim 7, wherein said at least one R-Tree-based multidimensional hierarchical categorization tree further comprises a precomputed domain block tree.

9. An apparatus for transmitting multimedia as recited in claim 7, said apparatus further comprising a fractal encoding unit in communication with said R-Tree-based multidimensional hierarchical categorization tree construction unit, wherein said fractal encoding unit is configured to conduct a fractal encoding operation on the at least one R-Tree-based multidimensional hierarchical categorization tree.

10. An apparatus for transmitting multimedia as recited in claim 1, wherein said an audio compression unit further comprises:

a transform unit for receiving the audio portion of the multimedia frame and conducting a WP transform thereon; and a quantization unit in communication with the transform unit for conducting a quantization operation on at least one WP coefficient representing the audio portion of the multimedia frame.

11. An apparatus for transmitting multimedia as recited in claim 10, wherein said audio compression unit further comprises:

at least one storage unit in communication with said transform unit and said quantization unit for storing at least one of a WP transform and a result of a quantization operation.

12. A computer assisted apparatus for transmitting multimedia, said computer comprising a processor, said apparatus comprising:

an image compression module;
an audio compression module; and
a control interface in connection with said image compression module and said audio compression module,
wherein said image compression module uses R-Tree-based multidimensional hierarchical categorization trees to compress, via the processor, an image portion of a multimedia data, and said audio compression module uses a filter bank decomposition operation to compress a corresponding audio portion of the multimedia data, and
wherein the R-Tree-based multidimensional hierarchical categorization trees examine pixel blocks that are structurally similar to a reference block, and organize pixel blocks in a hierarchical manner.

13. An apparatus for compressing multimedia data as recited in claim 12, wherein said image compression module is configured to use the R-Tree-based multidimensional hierarchical categorization trees in a fractal coding operation to compress the image portion of the multimedia data.

14. An apparatus for compressing multimedia data as recited in claim 12, wherein said image compression module further comprises:

an image converter, said image converter receiving a multimedia image and separating a UV component of the multimedia image from an RGB component of the multimedia image;

a tree construction unit in communication with the image converter unit, said image construction unit constructing said R-Tree-based multidimensional hierarchical categorization trees;

a rate manager in communication with the tree construction unit, said rate manager operating to control and prioritize information generated by the apparatus and to minimize perceivable deficiencies; and a fractal encoding unit in communication with the rate manager, said fractal encoding unit being configured to conduct a fractal encoding operation on the R-Tree-based multidimensional hierarchical categorization trees.

15. An apparatus for compressing multimedia data as recited in claim 12, wherein said audio compression module further comprises:

a WP transform module, said WP transform module being configured to apply a WP transform to the audio portion of the multimedia data to generate-representative WP coefficients; and a quantization unit in communication with the transform module, said quantization unit being configured to quantize the representative WP coefficients.

16. An apparatus for compressing multimedia data as recited in claim 15, wherein said quantization unit is further configured to quantize the WP coefficients using a scalar quantization table method.

17. An apparatus for compressing multimedia data as recited in claim 12, wherein said control interface further comprises:

a bit rate manager in communication with the image compression module and the audio compression module; and a merger/entropy unit in communication with the bit rate manager;

wherein said bit rate manager is configured to cooperatively control the operation of the image compression module and the audio compression module, and said merger/entropy unit is configured to merge and entropy encode both the compressed image and audio portions of the multimedia data.

18. A computer assisted method for compressing multimedia data, said computer comprising a processor, said method comprising the steps of:

receiving multimedia;
separating an audio portion of the multimedia and an image portion of the multimedia;
compressing, via the processor, the image portion with R-Tree-based multidimensional hierarchical categorization trees;
compressing the audio portion with a filter bank decomposition; and merging and synchronizing the compressed audio and image portions for transmission,
wherein the step of compressing the image portion with R-Tree-based multidimensional hierarchical categorization trees comprises examining pixel blocks that are structurally similar to a reference block, and organizing pixel blocks in a hierarchical manner.

19. A method for compressing multimedia data as recited in claim 18, wherein the compressing the image portion step further comprises compressing the image portion with R-Tree-based multidimensional hierarchical categorization trees in a fractal coding algorithm.

20. The method for compressing multimedia data as recited in claim 18, wherein the compressing the image portion step further comprises the steps of:
transforming the image portion into a YUV format;
constructing a hierarchical categorization tree of the image;
computing a fractal mapping of the hierarchical categorization tree; and
reducing the computed fractal mapping.

21. The method for compressing multimedia data as recited in claim 20, wherein the step of constructing a hierarchical categorization tree further comprises the steps of:
constructing a hierarchical categorization range tree;
constructing a hierarchical categorization domain tree;
matching the hierarchical categorization range tree to the hierarchical categorization domain tree;
locating an optimal domain block corresponding to the match; and
calculating a transformation for the optimal domain block.

22. The method for compressing multimedia data as recited in claim 18, wherein the step of compressing the audio portion further comprises the steps of:
analyzing the audio portion with a WP transform to determine WP coefficients;
quantizing the WP coefficients using an individual scaling factor to determine quantization coefficients;
storing the quantization coefficients;
determining a difference between the stored quantization coefficients and determined coefficients of a neighboring frame; and
transmitting the determined difference.

23. The method for compressing multimedia data as recited in claim 18, wherein the merging and synchronizing step further comprises:
merging the compressed audio and image portions into a common compressed multimedia data form; and
conducting a final non-content specific compression on the compressed multimedia data form.

24. A computer assisted apparatus for transmitting multimedia, said computer comprising a processor, said apparatus comprising:
an image compression means for compressing an image portion of a multimedia data frame via the processor;
an audio compression means for compressing an audio portion of the multimedia frame;
a bit rate manager means in communication with said image compression means, and said audio compression means for controlling frame flow; and
a merger means in communication with each of said image compression means and said audio compression means for merging a compressed image portion and a compressed audio portion into a common compressed multimedia frame,
wherein the image compression means utilizes R-Tree-based multidimensional hierarchical categorization trees to compress said image portion, and
wherein the R-Tree-based multidimensional hierarchical categorization trees examine pixel blocks that are structurally similar to a reference block, and organize pixel blocks in a hierarchical manner.

25. An apparatus for transmitting multimedia as recited in claim 24, wherein the image compression means is further configured to use the R-Tree-based multidimensional hierarchical categorization trees in a fractal coding environment to compress said image portion.

26. An apparatus for transmitting multimedia as recited in claim 24, wherein said audio compression means is configured to execute a filter bank decomposition operation to compress the audio portion of the multimedia frame.

27. An apparatus for transmitting multimedia as recited in claim 26, wherein said filter bank decomposition operation further comprises a wavelet packet transform.

28. An apparatus for transmitting multimedia as recited in claim 24, wherein said image compression means further comprises:
an image converter for separating a UV portion from an RGB portion;
a tree construction unit in connection with the image converter for constructing the R-Tree-based multidimensional hierarchical categorization tree;
a block differencer and prioritizer unit in connection with the tree construction unit for optimizing the R-Tree-based multidimensional hierarchical categorization trees;
at least one storage unit in connection with the image converter and the tree construction unit for storing at least one of a UV portion of the multimedia image and the R-Tree-based multidimensional hierarchical categorization trees;
a fractal encoding unit in connection with the at least one storage unit for executing a fractal encoding operation based upon the R-Tree-based multidimensional hierarchical categorization trees; and
a control unit in connection with the at least one storage unit, the image converter, the tree construction unit, the fractal encoding unit, and the merger unit for regulating the operation of the apparatus.

29. An apparatus for transmitting multimedia as recited in claim 24, wherein said bit rate manager means is further configured to prioritize information generated by the apparatus and to minimize perceivable deficiencies.

30. An apparatus for transmitting multimedia as recited in claim 24, wherein said image compression means further comprises a R-Tree-based multidimensional hierarchical categorization tree construction unit,
wherein said R-Tree-based multidimensional hierarchical categorization tree construction unit is configured to construct at least one R-Tree-based multidimensional hierarchical categorization tree that is representative of the image portion of the multimedia frame.

31. An apparatus for transmitting multimedia as recited in claim 30, wherein said at least one R-Tree-based multidimensional hierarchical categorization tree further comprises a precomputed domain block tree.

32. An apparatus for transmitting multimedia as recited in claim 30, said apparatus further comprising a fractal encoding unit in communication with said R-Tree-based multidimensional hierarchical categorization tree construction unit, wherein said fractal encoding unit is configured to conduct a fractal encoding operation on the at least one multidimensional hierarchical categorization tree.

33. An apparatus for transmitting multimedia as recited in claim 24, wherein said an audio compression means further comprises:
   a transform unit for receiving the audio portion of the multimedia frame and conducting a WP transform thereon; and
   a quantization unit in communication with the transform unit for conducting a quantization operation on at least one WP coefficient representing the audio portion of the multimedia frame.

34. An apparatus for transmitting multimedia as recited in claim 33, wherein said audio compression means further comprises:
   at least one storage unit in communication with said transform unit and said quantization unit for storing at least one of a WP transform and a result of a quantization operation.

35. A computer assisted apparatus for compressing multimedia data, said computer comprising a processor, said apparatus comprising:
   an image compression means;
   an audio compression means; and
   a control means in connection with said image compression means and said audio compression means,
   wherein said image compression means uses R-Tree-based multidimensional hierarchical categorization trees to compress, via the processor, an image portion of a multimedia data, and said audio compression means uses a filter bank decomposition operation to compress a corresponding audio portion of the multimedia data, and
   wherein the R-Tree-based multidimensional hierarchical categorization trees examine pixel blocks that are structurally similar to a reference block, and organize pixel blocks in a hierarchical manner.

36. An apparatus for compressing multimedia data as recited in claim 35, wherein said image compression means is configured to use the R-Tree-based multidimensional hierarchical categorization trees in a fractal coding operation to compress the image portion of the multimedia data.

37. An apparatus for compressing multimedia data as recited in claim 35, wherein said image compression means further comprises:
   an image converter, said image converter receiving a multimedia image and separating a UV component of the multimedia image from an RGB component of the multimedia image;
   a tree construction unit in communication with the image converter unit, said image construction unit constructing said R-Tree-based multidimensional hierarchical categorization trees;
   a rate manager in communication with the tree construction unit, said rate manager operating to control and prioritize information generated by the apparatus and to minimize perceivable deficiencies; and
   a fractal encoding unit in communication with the rate manager, said fractal encoding unit being configured to conduct a fractal encoding operation on the R-Tree-based multidimensional hierarchical categorization trees.

38. An apparatus for compressing multimedia data as recited in claim 35, wherein said audio compression means further comprises:
   a WP transform module, said WP transform module being configured to apply a WP transform to the audio portion of the multimedia data to generate representative WP coefficients; and
   a quantization unit in communication with the transform module, said quantization unit being configured to quantize the representative WP coefficients.

39. An apparatus for compressing multimedia data as recited in claim 38, wherein said quantization unit is further configured to quantize the WP coefficients using a scalar quantization table method.

40. An apparatus for compressing multimedia data as recited in claim 35, wherein said control means further comprises:
   a bit rate manager in communication with the image compression module and the audio compression module; and
   a merger/entropy unit in communication with the bit rate manager;
   wherein said bit rate manager is configured to cooperatively control the operation of the image compression module and the audio compression module, and said merger/entropy unit is configured to merge and entropy encode both the compressed image and audio portions of the multimedia data.

41. An apparatus for transmitting multimedia as recited in claim 3, wherein said filter bank decomposition operation comprises a 42-frequency band decomposition filter bank tree structure.

42. An apparatus for compressing multimedia data as recited in claim 12, wherein said filter bank decomposition operation comprises a 42-frequency band decomposition filter bank tree structure.

43. An apparatus for compressing multimedia data as recited in claim 38, wherein said WP transform module implements a 42 band decomposition filter bank tree structure.

44. An apparatus for compressing multimedia data as recited in claim 43, wherein the filter bank decomposition filter bank tree structure comprises Daubechies wavelets.

45. An apparatus for transmitting multimedia data as recited in claim 10, wherein the WP transform used in the audio portion is implemented with an iterated 2-channel filter bank.

46. An apparatus for compressing multimedia data as recited in claim 15, wherein the WP transform used in the audio portion is implemented with an iterated 2-channel filter bank.

47. An apparatus for compressing multimedia data as recited in claim 15, wherein the WP transform is used as a filter bank decomposition tool.

48. The method for compressing multimedia data as recited in claim 22, wherein after filter bank decomposition, audio portions are transmitted into a psychoacoustic masking model which identifies redundant audio information.

49. An apparatus for compressing multimedia as recited in claim 22, wherein in the quantization step, an individual scaling factor for each of 42 frequency bands is used.

50. An apparatus for transmitting multimedia as recited in claim 33, wherein in the quantization operation, an individual scaling factor for each of 42 frequency bands is used.

* * * * *